April 30, 1963 E. ROOT III 3,087,347
COUNTING DEVICES
Original Filed Aug. 13, 1947
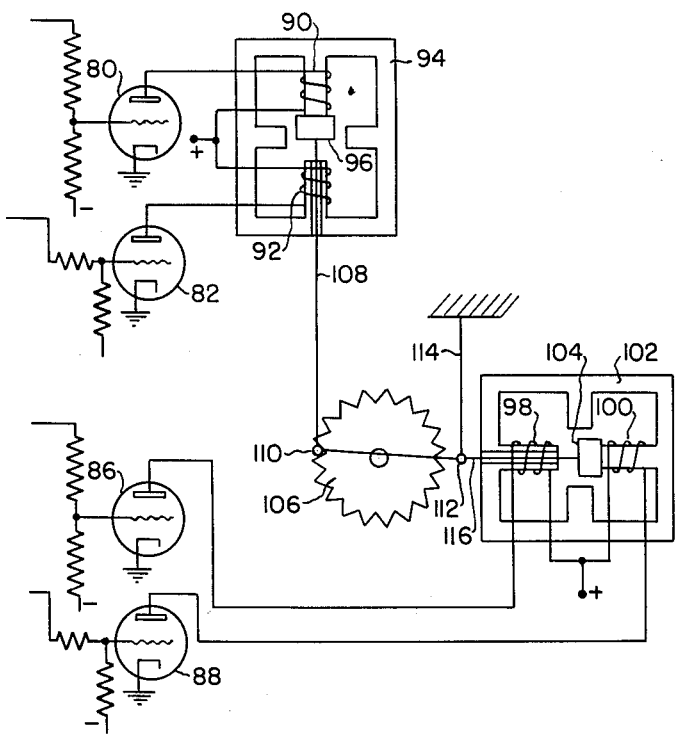
INVENTOR.
ELIHU ROOT, III
BY
KENWAY, JENNEY, WITTER & HILDRETH
ATTORNEYS

United States Patent Office 3,087,347
Patented Apr. 30, 1963

3,087,347
COUNTING DEVICES
Elihu Root III, College Hill, Clinton, N.Y.
Application June 21, 1952, Ser. No. 294,811, now Patent No. 2,918,215, dated Dec. 22, 1959, which is a division of application Ser. No. 768,300, Aug. 13, 1947, now Patent No. 2,604,004, dated July 22, 1952. Divided and this application Dec. 3, 1959, Ser. No. 857,085
4 Claims. (Cl. 74—128)

This invention relates to counting devices and more particularly to devices for making additive and subtractive counts. This application is a division of my copending application Serial No. 294,811, filed June 21, 1952 (issued as Patent No. 2,918,215, dated December 22, 1959), which in turn is a division of my application Serial No. 768,300, filed August 13, 1947, now Patent No. 2,604,- 004, granted July 22, 1952.

The principal object of the invention is to provide a reversible mechanical counter, i.e., a counter capable of adding or subtracting, in which the possibility of false counts due to vibration or to uncertainties or ambiguities at transition points is avoided.

The above mentioned patents describe a counter system particularly useful in measuring apparatus whereby an article is measured by counting a succession of interference "fringes," as described in my above-mentioned application. The counter is operated in what may be termed a substantially continuous fashion, as distinguished from the counting of impulses. While reversible counters for continuous phenomena have been proposed, they have, so far as I am aware, suffered from a defect in the nature of backlash in that reversals which occur in the neighborhood of a transition point may give rise to miscounts. My application Serial No. 294,811 describes a reversible multistage electronic counter terminating in a mechanical counter. It is the mechanical counter which forms the subject matter of this application.

According to the present invention the counting system is free of backlash and is subject to continuous reversible control in the neighborhood of a transition point, whereby a correct net count is obtained, notwithstanding oscillations, whether due to "noise" or otherwise, that may occur in the system.

The accompanying drawing is a diagram of the preferred form of counter according to the present invention.

The counter of the present invention is described in my prior patents as the final counting stage of a system for precise measurement by the counting of changes of illumination due to interference phenomena.

In said applications, an interferometer is used, and photo-sensitive means are responsive to the changes of illumination. The outputs of the photo-sensitive means are arranged to produce non-impulsive outputs in phase quadrature, which are then fed to successive stages of an electronic counter. In each stage, two phased output signals are produced, the signals of each stage being of twice the period of its preceding stage.

The final outputs of the electronic counter appear in the anode circuits of the tubes 80 and 82 for phase I and of the tubes 86 and 88 for phase II. These outputs are preferably of rectangular wave form. The anode circuits of 86 and 88 (phase II) are 180° out of phase with each other and 90° out of phase with the corresponding circuits of 80 and 82 (phase I). The anode of triode 80 is connected to an electromagnet coil 90 and that of anode 82 to a coil 92. The coils are mounted on a core 94 having poles between which is placed an armature 96. The armature is adapted to be attracted to one pole or the other depending upon the energization of coil 90 or coil 92. Similarly for phase II the output of the triodes 86 and 88 is connected to coils 98 and 100 on a core 102. An armature 104 is adapted to be attracted to one or the other of the poles.

The armatures 96 and 104 are connected to operate a multi-tooth star wheel 106 which is mounted for rotation in any suitable manner. A length of wire 108 is connected to one of the armatures, say the armature 96. The wire should be flexible in bending but fairly stiff longitudinally. A piece of piano wire has been found satisfactory for the short length here required. The wire is provided with two pins 110 and 112 which are selectively adapted to enter between selective teeth of the wheel 106. Thus, in the position shown, the pin 110 is between two teeth while the pin 112 is clear of the teeth. This is the condition existing when the armature 96 is attracted to the upper pole. Upon energization of the lower pole through the coil 92 the pin 110 is moved downwardly.

A wire 114 is connected between the pin 112 and a suitable fixed point. Another wire 116 is connected from the armature 104 to the pin 112. It will be seen that the pin 112 is primarily a detent member and substantially constrained to undergo a simple radial (left and right) motion by reason of the connection of the wire 114. On the other hand, the pin 110 is free to undergo a compound motion. This compound motion is made up of the tangential (up and down) component due to the motion of the wire 108 together with a sidewise component due to the lateral motion of the wire 116. The compound motion is permitted because of the flexibility of the wire 108 between the pin 110 and the pin 112. Since the coils of the magnet 102 are energized 90° out of time phase with the coils of magnet 94 and since the wires 108 and 116 are phased in space by 90°, the pin 110 will undergo a rotary motion. The direction of the rotary motion of the pin 110 depends on whether the time energization of the coils 98 and 100 is in a leading or lagging relation to the energization of the coils of the magnet 94. Thus, for one phase relation the pin 110 will undergo, say, a clockwise motion, while the opposite phase relation will cause the pin 110 to undergo a counterclockwise motion. The range of motion of the pin 110 is so related to the spacing of the teeth that one tooth is advanced for each revolution of the pin. It will be observed that the pin 110 engages with an intertooth space at the left of the wheel just as pin 112 is being retracted from the intertooth space at the right of the wheel so that the motion is permitted. When the pin 110 retracts from engagement, the pin 112 enters an intertooth space and this serves as a detent to prevent over-rotation.

Because of the lightness of the parts, it is possible to count faster than with conventional mechanical counters. The wheel 106 is advanced one tooth for each complete cycle.

The mechanical counter herein described, like the electronic counter described in my above-mentioned patents, does not depend on backlash for its operation. It provides continuous reversible control, so that correct additive and subtractive counts are made regardless of oscillations of changes of direction in the inputs.

Having thus described my invention, I claim:
1. A reversible counter comprising a wheel, an actuating member to engage the wheel with a substantially tangential motion to move the wheel in one direction or the other, a detent member movable in a substantially radial direction with respect to the wheel, means for moving said members in an out-of-phase relationship with respect to the wheel and connecting means between the detent member and the actuating member to cause said actuating member to be moved radially out of engagement with the wheel when the detent member is moved into engagement with the wheel.
2. A reversible counter comprising a toothed wheel, an actuating pin to engage the wheel with a substantially tan- gential motion to move the wheel in one direction or the other, a detent pin movable in a substantially radial direction with respect to the wheel, means for moving said pins in an out-of-phase relationship with respect to the wheel and connecting means between the detent pin and the actuating pin to cause the actuating pin to be moved radially out of engagement with the wheel when the detent pin is moved into engagement with the wheel.

3. A reversible counter comprising a wheel, an actuating member to engage the wheel, non-impulsive driving means for imparting to said member a substantially tangential component of motion in either direction with respect to the wheel, a second driving means for imparting to said member a component of motion toward and from the wheel, and means for operating said driving means in a time-phase relationship, whereby the tangential motion of the actuating member occurs only when it is not being moved toward or from the wheel.

4. A reversible counter comprising a toothed wheel, an actuating pin to engage the wheel, non-impulsive driving means for imparting to the pin a substantially tangential component of motion in either direction with respect to the wheel, a second driving means for imparting to the pin a component of motion toward and from the wheel, and means for operating said driving means in a time-phase relationship, whereby the tangential motion of the pin occurs only when it is not being moved toward or from the wheel.

References Cited in the file of this patent
UNITED STATES PATENTS

| | | |
|---|---|---|
| 413,369 | Hutchins | Oct. 22, 1889 |
| 703,057 | Graham | June 24, 1902 |
| 1,094,627 | Bancroft-Indahl | Apr. 28, 1914 |
| 1,243,169 | Herman | Oct. 16, 1917 |
| 1,968,973 | Thompson | Aug. 7, 1934 |
| 1,985,007 | Ashworth | Dec. 18, 1934 |
| 2,135,918 | Streeter | Nov. 8, 1938 |
| 2,304,514 | Sutton | Dec. 8, 1942 |
| 2,432,141 | Dehmel | Dec. 9, 1947 |
| 2,784,599 | Moulin | Mar. 12, 1957 |
| 2,829,530 | Holden | Apr. 8, 1958 |
| 2,857,769 | Bale | Oct. 28, 1958 |

FOREIGN PATENTS

| | | |
|---|---|---|
| 338,208 | Germany | June 13, 1921 |
| 503,916 | Great Britain | Apr. 12, 1939 |